April 15, 1941.  A. C. HORESI ET AL  2,238,590
PRECIPITATION OF ZEIN BY SPRAYING
Filed Aug. 18, 1937
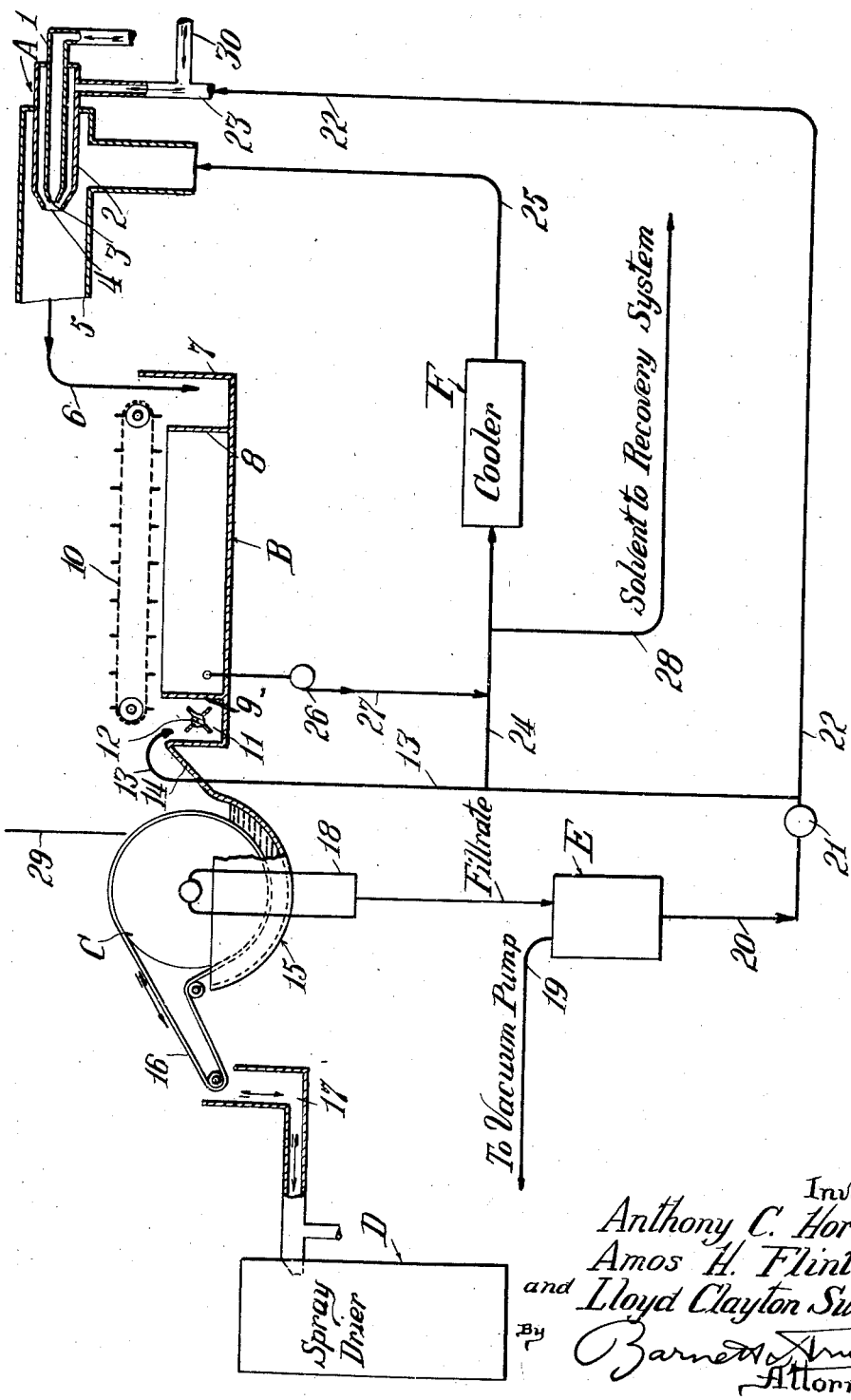
Inventors
Anthony C. Horesi
Amos H. Flint
and Lloyd Clayton Swallen
By
Barnett Truman
Attorneys Patented Apr. 15, 1941

2,238,590

UNITED STATES PATENT OFFICE 2,238,590

PRECIPITATION OF ZEIN BY SPRAYING

Anthony C. Horesi, Downers Grove, Amos H. Flint, Chicago, and Lloyd C. Swallen, Pekin, Ill., assignors, by mesne assignments, to Corn Products Refining Company, New York, N. Y., a corporation of New Jersey Application August 18, 1937, Serial No. 159,728

5 Claims. (Cl. 18—8)

This invention relates to the precipitation of zein from its solution, for example, the precipitation of zein in water from an aqueous alcohol solution of the zein, and the dehydration of the precipitated zein; and the primary object of the invention is to provide a new and improved apparatus for effecting this operation, whereby the operation is performed more conveniently and economically and the zein is produced in a more desirable condition than has been possible by apparatuses heretofore used.

Among the more important specific objects of the invention are the following:

(1) To bring about precipitation of the zein in a state of high dispersion, for example, with the solids in the form of a loose mass of fine threads, fibers or filaments, instead of as a more or less solid dough, as has been usual heretofore; whereby the solvent is more readily removed from the zein, so that the zein the filaments of which will be quite brittle when the solvent has been extracted will break up and can be dried in the form of minute particles or granules, which will not stick together but will form a free flowing mass. Heretofore it has been customary to precipitate the zein in the form of a dough and to roll out the dough into sheets and then remove the solvent by soaking the sheets in water which is a process attended with several inconveniences.

(2) To provide an apparatus for continuously precipitating and dehydrating the zein instead of by the batch processes ordinarily used heretofore.

(3) To provide a convenient means for regulating the alcohol concentration of the water medium used in the precipitating operation and for recovering and reusing the excess alcohol.

(4) To provide novel means for precipitating zein from its solution in which the zein is reduced to a finely divided state and discharged directly into a body of flowing water; whereby the zein is in the form of fine threads, fibres or filaments, referred to above, from which the alcohol will be readily extracted and the surface stickiness of the zein bodies so reduced that they will not adhere to each other during the subsequent steps of the process.

(5) To provide in other respects a suitable apparatus for carrying out the process as outlined above.

Other incidental objects will be adverted to in the following description of what is deemed the preferred embodiment of the invention. The disclosed process is not claimed herein being claimed in application Serial No. 214,512, filed June 18, 1938, as a continuation in part hereof.

Apparatus embodying the invention is shown in the accompanying drawing which is a diagrammatic layout of a preferred form of apparatus.

Referring to the drawing, A is a nozzle consisting of an inner tubular member 1 for the zein solution and an outer tubular member 2 for compressed air and water; the nozzle members being formed with concentric restricted orifices 3 and 4, respectively. The forward end of the nozzle A is enclosed in a receiving casing 5 from which leads a pipe 6 to the weir box 7 of a flotation tank B provided at opposite ends with weirs 8 and 9. A chain drag 10 carries the zein filaments which float on the surface of the liquid in the flotation tank into a mixing box 11, preferably provided with a rotating agitator 12. The zein passes from the mixing box 11, which receives water through pipe 13, over an apron 14 to the receiving vessel 15 of a vacuum filter C of the drum and belt type, the belt 16 of which delivers the de-watered zein to a conduit 17 leading to a spray drier D. The filter C is provided with a discharge conduit 18 for filtrate, which filtrate passes into a receiver E provided with a connection 19 to the vacuum pump (not shown) of filter C. The filtrate is withdrawn from the receiver E through pipe 20 by pump 21 and some of it pumped into the mixing box 11, through pipe 13, mentioned above, some of it through pipe 22 to the induction pipe 23 of the outer nozzle member 2 of the nozzle A, and some of it through pipe 24 to the circulating water in the precipitating system. A large volume of liquid is withdrawn from the flotation tank B by pump 26 located in a pipe 27, and is circulated through the cooler F and pipe 25 into the casing 5 surrounding the nozzle tip.

The withdrawal of the precipitating medium through pipe 28 is calculated so as to maintain a proper alcohol content in the precipitating medium and a corresponding amount of water is introduced through wash water pipe 29 of the filter C. Preferably compressed air is introduced into the induction pipe 23 of the outer nozzle member 2 through the branch pipe 30 for the purpose of increasing turbulence in the water envelope surrounding the zein stream and to aerate the precipitated zein so that it will float in the flotation vessel B.

It will be understood that the apparatus as just described is merely typical. The intention is to cover by patent all equivalents and all modifications within the scope of the claims appended hereto.

In operation it is preferable to use a relatively heavy solution, one containing between 10 and 30 grams of protein per 100 cubic centimeters of zein solution, although operation within this range is not essential. A suitable solution is one which is obtained by treating the zein extract with enough of a hydro-carbon solvent of maize-oil and coloring matter to bring about a separation of the mixture into two liquid phases, the heavier of which contains the zein; this heavier liquid being used either directly in the precipitating operation or after dilution with alcohol or after removal of oil solvent by distillation. The precipitating medium is cooled in cooler F to a temperature not substantially in excess of 20° C. and preferably below 15° C. in order to insure the precipitation of the zein in a non-sticky state and has preferably an alcohol content of 10 per cent or less by volume. The zein solution orifice of the nozzle made by the sharp taper of the end of tubular member 1 may be about $\frac{1}{16}$ of an inch in diameter; and the orifice for the atomizing medium, water and air, made by correspondingly tapering the end of tubular member 2 from $\frac{3}{32}$ of an inch to $\frac{1}{8}$ of an inch in diameter. The pressure of the zein solution may be from 25 to 40 pounds per square inch and its rate of feed 5 to 20 gallons per hour. The pressure of the atomizing fluid may be 40 pounds per square inch and its rate of flow 100 to 150 gallons per hour. The tapered end of tubular member 2 directs the dispersing fluid at high pressure against the stream of zein and brings about the reduction of the zein into the desired fine filamentary form.

These conditions are not to be regarded as limitations. They specify one set of acceptable and preferred operating conditions.

Under these conditions the zein issues from the nozzle in the form of a stream of liquid about 1/16 of an inch in diameter which on contact with the surrounding stream of water from nozzle 2, and due to its velocity and turbulence, is changed into a loose mass of threads or filaments of precipitated zein of about 0.02 to 0.04 of an inch diameter. In this form, and surrounded as they are by water, the extraction of the rest of the alcohol solvent from the zein takes place very rapidly, so that the natural stickiness of the zein is reduced, as a result of which the material may be treated without lumping or sticking together during the subsequent steps of the process. The aqueous medium in which the zein is dispersed is aerated by the air introduced through pipe 30 and this aids in keeping the mass of zein filaments in suspension until complete coagulation takes place. When dried, the filaments, which are of a spongy character, will crumble into small flakes or particles so that the material will be granular and relatively free flowing.

The completion of the alcohol extraction takes place in the flotation tank B. The zein in the mixing box 11 of the flotation vessel is moved by water introduced into the box at 13, into the receiving vessel 15 of the filter C. Here the material is partially dehydrated. Drying may be completed in any desired manner, as for example, in the spray drier D.

The effectiveness of the operation, both as to the quick and complete extraction of the zein solvent and the reduction of the material to a dry, non-sticky, granular state results from the high degree of dispersion of the material in the water bath, in which it is immersed and suspended immediately after it has been reduced to the fine filamentary state by action of the nozzle.

The following is a specific example of the application of the invention to practice. This example is purely typical and informative. The operating data might be changed very considerably without departure from the principles of the invention, as will be evident.

*Example*

A nozzle is used having a solution jet of 1/16 of an inch in diameter and a water jet of 7/64 of an inch in diameter, the zein jet orifice being placed 1/16 of an inch behind the water orifice. The concentration of the zein is 28 grams per 100 cubic centimeters of the solution. The pressure of the zein solution on the nozzle is 35 pounds per square inch. The water pressure is 40 pounds per square inch. The zein solution passes through the nozzle at the rate of 7 gallons per hour. The water rate through the nozzle is 100 gallons per hour. The precipitating medium is circulated through the cooler and past the nozzle tip at the rate of 40 gallons per minute. This circulation is maintained at an alcohol concentration of about 10%, whereas, the filtrate from filter C has a lower concentration, about 5%. The temperature of the precipitating medium used is about 15° C. The zein is precipitated in fibrous filamentary form and the fibers of coagulated zein rapidly lose all tendency to form dough on application of moderate pressure. The material can be filtered off readily and yields a mass which crumbles easily but which still contains about 74% of water. Drying in the air at room temperature yields a light fluffy zein which dissolves in alcohol with extreme ease.

I claim:

1. Apparatus for precipitating zein from its solution and recovering the zein, as a solid, in a finely divided state comprising: an inner zein solution nozzle for forming a fine stream; a conduit of much larger cross section than the nozzle into which the nozzle projects; an outer tubular nozzle surrounding said zein solution nozzle; means for causing a liquid precipitating medium to flow through said conduit in much larger volume than the flow of zein solution through the zein nozzle; means for forcing a zein solution through said zein nozzle into the liquid flowing through said conduit whereby the zein is precipitated as a loose, filamentary, liquid permeable mass; and means for forcing a fluid through said outer nozzle to bring about turbulence promoting the dispersion of the zein in the precipitating liquid.

2. Apparatus for precipitating zein from its solution and recovering the zein, as a solid, in a finely divided state comprising: an inner zein solution nozzle for forming a fine stream; a conduit of much larger cross section than the nozzle into which the nozzle projects; an outer tubular nozzle surrounding said zein solution nozzle; means for causing a liquid precipitating medium to flow through said conduit in much larger volume than the flow of zein solution through the zein nozzle; means for forcing a zein solution through said zein nozzle whereby the zein is precipitated as a loose, filamentary, liquid permeable mass; and means for forcing additional precipitating liquid through said outer nozzle to bring about tuburlence and promote the dispersion of the zein in the precipitating liquid.

3. Apparatus for precipitating zein from its solution and recovering the zein, as a solid, in a finely divided state comprising: an inner zein solution nozzle for forming a fine stream; a conduit of much larger cross section than the nozzle into which the nozzle projects; an outer tubular nozzle surrounding said zein solution nozzle; means for causing a liquid precipitating medium to flow through said conduit in much larger volume than the flow of zein solution through said zein nozzle; means for forcing a zein solution through said zein nozzle whereby the zein is precipitated as a loose, filamentary, liquid permeable mass; means for forcing air through said outer nozzle to aerate the zein and thereby cause it to float; a flotation vessel connected with said conduit to receive said filamentary mass and precipitating liquid from said conduit; and means for removing from the flotation vessel zein floated therein through action of said air.

4. Apparatus for precipitating zein from its solution and recovering the zein, as a solid, in a finely divided state comprising: a zein solution nozzle for forming a fine stream; a conduit of much larger cross section than the nozzle into which the nozzle projects; means for causing a liquid precipitating medium to flow through said conduit in much larger volume than the flow of zein solution through the zein nozzle; means for forcing zein solution through said nozzle into the precipitating liquid in said conduit whereby the zein is precipitated as a loose, liquid permeable, filamentary mass; a flotation vessel connected to said conduit to receive the filamentary zein mass and precipitating liquid; and means for injecting air into the precipitating liquid to cause the filamentary mass to float in the flotation vessel.

5. Apparatus for precipitating zein from its solution and recovering the zein, as a solid, in a finely divided state comprising: a zein solution nozzle for forming a fine stream; a conduit of much larger cross section than the nozzle into which the nozzle projects; means for causing a liquid precipitating medium to flow through said conduit in much larger volume than the flow of zein solution through the zein nozzle; means for forcing zein solution through said zein nozzle into the precipitating liquid in said conduit, whereby the zein is precipitated in a loose, liquid permeable, filamentary mass; a flotation vessel connected to said conduit to receive the filamentary zein mass and precipitating liquid from said conduit; means for injecting air into the precipitating medium to cause the filamentary mass to float in the flotation vessel; and means for cooling the precipitating liquid to maintain a relatively low temperature during contact of the precipitating liquid with the zein.

ANTHONY C. HORESI.
AMOS H. FLINT.
LLOYD C. SWALLEN.